United States Patent [19]

Sardo

[11] 4,213,533

[45] Jul. 22, 1980

[54] AUTOMATIC MACHINE FOR IN PARTICULAR CALIBRATING FRUIT AND VEGETABLES

[75] Inventor: Alberto Sardo, Le Chesnay, France

[73] Assignee: Xeda International S.A., LaChesnay, France

[21] Appl. No.: 902,276

[22] Filed: May 3, 1978

[30] Foreign Application Priority Data

May 18, 1977 [IT] Italy ............................... 12609 A/77

[51] Int. Cl.$^2$ .............................................. B07C 5/12
[52] U.S. Cl. ................................... 209/654; 209/663; 209/701
[58] Field of Search ............... 209/654, 663, 668, 670, 209/673, 540, 545, 701

[56] References Cited

U.S. PATENT DOCUMENTS

| | | | |
|---|---|---|---|
| 1,706,548 | 3/1929 | Schofield | 209/654 |
| 2,675,917 | 4/1954 | Powers | 209/545 |
| 3,575,292 | 4/1971 | Roda | 209/545 |
| 3,627,126 | 12/1971 | Fitzgerald | 209/654 |

*Primary Examiner*—Allen N. Knowles

[57] ABSTRACT

The machine calibrates round, oblong or spherical objects and in particular fruit and vegetables. It comprises a series of spaced-apart rollers which define cavities for receiving the objects. In these cavities, the objects rotate and place their equatorial plane in a vertical position. Calibrating rollers, oriented in a longitudinal direction or slightly inclined relative to the axis of the conveyor and at heights from the latter which decrease in the direction of conveyance of the conveyor, discharge the objects and cause them to drop through a minimum height onto a discharging conveyor placed thereunder.

6 Claims, 3 Drawing Figures

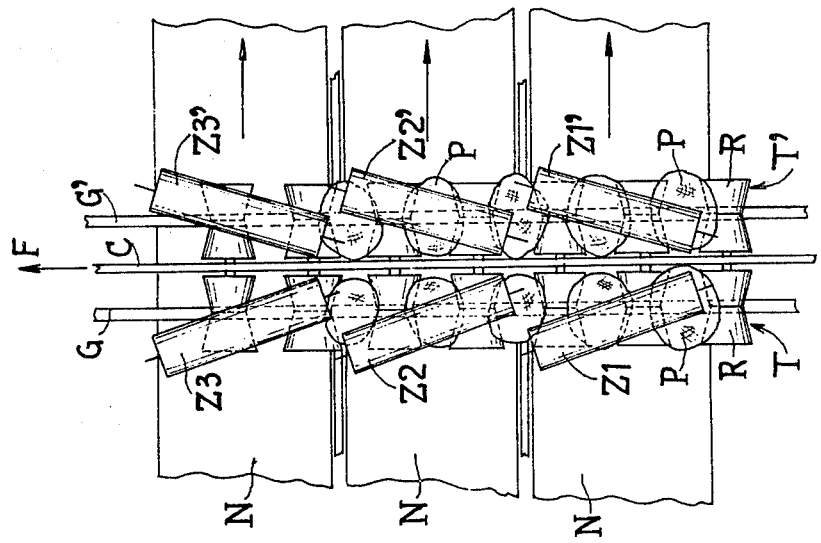
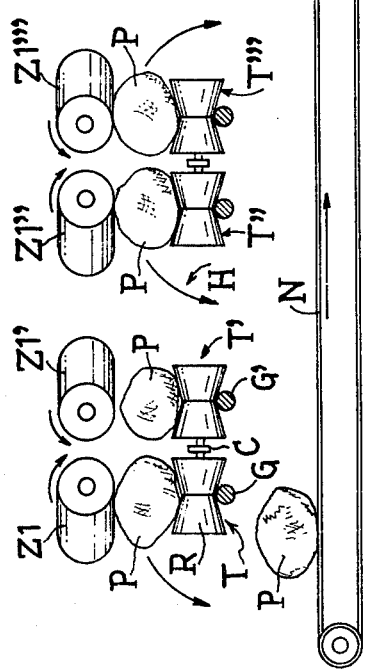
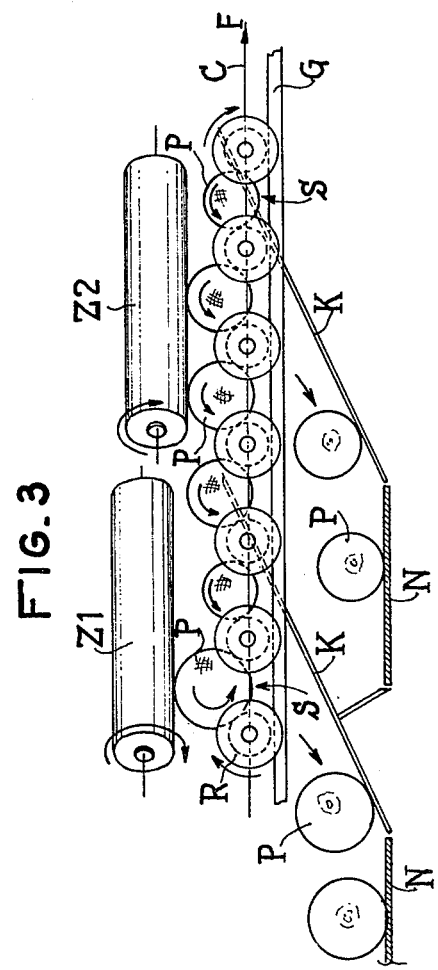

AUTOMATIC MACHINE FOR IN PARTICULAR CALIBRATING FRUIT AND VEGETABLES

The present invention relates to a machine for calibrating in a continuous cycle objects of round, oblong or spherical shape with or without flattened poles and more particularly fruit and vegetables. In order to simplify the ensuing description, reference will be made solely to fruit without this intending to exclude the other objects or products which may be calibrated by means of the machine according to the invention.

Although it classifies the fruit in accordance with their large diameter, in the manner of many known calibrating machines, the machine according to the invention is distinguished from these machines by greater simplicity of construction and operation inasmuch as it does not require synchronized feeders and it handles the fruit much more delicately.

The calibrating machine according to the invention comprises means for conveying the fruit in Indian file in one or more parallel files which are horizontal or suitably inclined in the longitudinal direction and preferably rectilinear or possibly curvilinear, second means for constraining the fruit to turn in a given direction on said conveying means and place their equatorial plane vertically, and stationary rotary calibrating means placed above the various fruit conveying means at a suitable distance and disposed longtiudinally in succession and coming in contact with an equatorial part of the fruit and discharging the fruit from their conveying means in a lateral direction. The rotary calibrating means are placed at progressively decreasing distances above each of the successive conveying means so as to subdivide the input stream of fruit into as many streams each of which contains fruit whose large diameter is between a predetermined minimum value and a predetermined maximum value. The machine also comprises means for discharging the fruit and/or other conveying means for receiving the fruit immediately at the output end of each rotary calibrating means or a group of a plurality of calibrating means and conveying the fruit in a plurality of separate streams to collecting or work stations, as usually occurs in known calibrating machines.

Further features and advantages of the invention will be apparent from the ensuing description with reference to the accompanying drawing which is given solely by way of example and in which:

FIG. 1 is a cross-sectional view of the machine in which a composite calibrating station is seen in front elevation;

FIG. 2 is a plan view of a plurality of successive calibrating stations in two work units of the machine, and FIG. 3 is a side-elevational view of two successive calibrating stations of any of the work units of the machine.

It will be clear from the foregoing Figures that, for carrying out the calibrating method according to the invention, the fruit must be conveyed in Indian file in at least one file which is preferably rectilinear and horizontal or suitably inclined in the longitudinal direction. This first condition can be satisfied, for example, by means of a conveyor T having rollers or grooved rolls R which are arranged one after the other (FIG. 2) and coupled at one end of their axis to at least one driving chain C. Guide means (see below) are provided for constraining the conveyor T to travel through a rectilinear and preferably horizontal path, at least in its upper portion, with a displacement of this portion or reach in the direction indicated by arrow F. There are spaces S between the consecutive rolls of the conveyor forming support cavities each of which receives a fruit P to be calibrated during the displacement of the upper reach of the conveyor. A first big advantage of the presently-described machine resides in the fact that the fruit can be fed to the cavities S of the conveyor in a very simple manner, for example by providing on the initial part, with respect to the direction of travel of the fruit, of the upper reach of the conveyor a loading hopper (not shown) which contains a heap of fruit. This conveyor is flush with, or extends through, a lower part of this hopper and issues therefrom with a fruit in each cavity S.

Another condition which must be satisfied in the calibration of the fruit resides in the fact that the fruit must always turn in the desired direction and must be disposed in the cavities S of the conveyor in such manner that their equatorial plane is contained in a vertical plane so as to reach in this disposition their position of cooperation with the calibrating means (see below).

This condition or, better still, this double condition may be satisfied, for example, by making the rollers R of the conveyor from a suitable/material having a high coefficient of friction and arranging that these rollers bear against and consequently roll along a fixed longitudinal guide G, or by employing other suitable means under the effect of which the rollers rotate in the clockwise direction, as viewed in FIG. 2, during the displacement of the upper reach of the conveyor, so that the fruit tend to rotate in their cavities in the counter-clockwise direction and place themselves in such manner that their equatorial plane is vertical.

The presently-described machine is completed by calibrating means which comprise in accordance with the invention rotary and stationary elements Z1, Z2, Z3 etc., the number of which is at least equal to the number of streams in which the fruit must be classified, these elements being arranged along the length of the upper reach of the conveyor T at progressively decreasing heights from said reach and with a disposition and a direction of rotation which are so arranged that, upon contact with an equatorial part of the fruit P, they are capable of expelling or discharging the fruit to one side of the conveyor where the fruit is rapidly received with a minimum drop by discharging means K and/or by conveyor belts N which convey them, in the various calibres, to packing or treating stations.

In a preferred embodiment, the rotary calibrating elements are formed by rollers of suitable lengths constructed wholly from, or covered with, a flexible material, of circular or lobed section and disposed parallel to the fruit conveyor. The calibrating rollers may be oriented longitudinally of the fruit conveyor or, if they have a radius less than the transverse radius of curvature of the cavities S of the conveyor, they may be suitably inclined as shown in FIGS. 1 and 2 so as to accompany the fruit until they have left their fruit support cavities.

Another important advantage of the machine according to the invention resides in the delicate manner with which the fruit is handled during the calibrating stage proper. This advantage is clearly revealed in FIG. 3. Indeed, FIG. 3 shows that owing to the particular direction of rotation imparted to the fruit P by the rollers R of the conveyor T, the fruit, in coming in contact with the lower part of the calibrating rollers Z1, Z2, Z3 etc., roll against these rollers without any friction and consequently with no deterioration of the fruit since the peripheral velocity is practically equal to the linear translation velocity of the fruit. In this way the fruit is only affected by the rotary component of the calibrating rollers which delicately expels the fruit through a side of the conveyor T. If it is also added that the conveyor is laterally open so that the fruit calibrated by the rollers Z1, Z2, Z3 etc., can be immediately received as it leaves the cavities S practically without falling, it will be readily understood that the machine according to the invention indeed handles the fruit delicately.

In order to increase the handling capacity of the machine, there may be provided two conveyors of the described type, designated in FIGS. 1 and 2 by the references T and T', arranged to be parallel and associated with a single driving chain. The machine may have a plurality of pairs of conveyors also arranged to be parallel in side-by-side relation on a single support structure, provided there is between these pairs of conveyors a free space of suitable width, that is to say a suitable distance H for discharging the calibrated fruit (FIG. 1). In this case, the calibrating rollers Z1, Z1', Z1", etc. which are placed in a single line extending transversely of the conveyors T, T', T" etc. disposed thereunder, may be connected to a single support structure which is adjustable in position and on which centralized means may be provided for driving these calibrating rollers.

By acting on these structures, the distance between the calibrating rollers and the conveyors thereunder may be varied and in this way vary the calibre of the fruit which will be detected and discharged by the rotary elements.

FIG. 2 shows that, when the fruit conveyors are employed in pairs and the rotary calibrating rollers are inclined, these calibrating rollers have, when viewed in plan, a hearing-bone configuration the divergence of which is oriented in the direction of operation of the conveyors.

It must be understood that the foregoing description concerns a preferred embodiment of the invention in respect of which many modifications and variations may be envisaged, above all as concerns the construction of the machine, without departing from the scope of the invention defined in the claims. These variations may reside for example in the use of means other than conveyors having rolls or rollers for conveying the fruit in Indian file and constraining the fruit to place themselves in such manner that their equatorial plane is vertical. For example, instead of roller conveyors, lead-screw conveyors or conveyors comprising parallel archimedes screws may be employed. The conveying means may be of a type suitable for placing the polar axis of the fruit obliquely or even longitudinally relative to their direction of travel.

The fruit conveying path may be curvilinear instead of rectilinear, for example if roundabout or carrousel conveyors are used. Other modifications may concern the rotary calibrating elements. The latter may be frustoconical or conical; they may have at least their front end suitably rounded or in an input shape; they may have a helicoidal or spiral-conical shape. Further, instead of being parallel to the conveyor thereunder, they may be suitably inclined and converge downwardly in the direction of operation of the conveyor. The calibrating elements may be formed by brushes or other rotating means which are simple or composite and capable of expelling the fruit laterally away from the conveying means thereunder.

Having now described my invention what I claim as new and desire to secure by Letters Patent is:

1. An automatic machine for calibrating in a continuous cycle substantially round, oblong or spherical objects with or without flattened poles and in particular fruits and vegetables, comprising: means for conveying said objects in Indian file, in at least one row; means for constraining said objects to rotate in a suitable manner on said conveying means and place their equatorial plane vertically; rotary calibrating means placed in an adjustable position above said conveying means at a distance which decreases in a direction in which said rotating objects are conveyed by the conveying means, the disposition relative to said conveying means and the direction of rotation of said calibrating means being such that in coming in contact with the equatorial part of said rotating objects the calibrating means delicately constrain said objects to laterally leave said conveying means; discharge means positioned for receiving said objects immediately and at an output end of said rotary calibrating means and conveying said objects in a plurality of separate rows, each of which rows corresponds to a different calibre of said objects, to receiving stations.

2. An automatic machine for calibrating in a continuous cycle substantially round, oblong or spherical objects with or without flattened poles and in particular fruits and vegetables, comprising: means for conveying said objects in Indian file, in at least one row; means for constraining said objects to rotate in a suitable manner on said conveying means and place their equatorial plane vertically; a plurality of rotary calibrating devices placed in an adjustable position above said conveying means at respectively different distances which decrease in a direction in which said rotating objects are conveyed by said conveying means, the disposition relative to said conveying means and the direction of rotation of said calibrating devices being such that in coming in contact with the equatorial part of said rotating objects the calibrating devices delicately constrain said objects to laterally leave said conveying means; discharge means positioned for receiving said objects immediately and at an output end of said rotary calibrating devices and conveying said objects in a plurality of separate rows, each of which rows corresponds to a different calibre of said objects, to receiving stations.

3. The automatic machine claimed in claim 2, wherein a plurality of said conveying means are provided which convey said objects in Indian file in a plurality of substantially parallel rows, said rotary calibrating means being respectively associated with each of said conveying means.

4. The automatic machine claimed in claim 2, wherein each of said rotary calibrating devices comprises a roller and said conveying means comprise rotary V-sectioned grooved rollers arranged in alignment in a direction transverse to an axis of rotation of the rollers, and means drivingly connected to said rollers to rotate said rollers.

5. The automatic machine claimed in claim 4, wherein said roller of each of said rotary calibrating devices is inclined relative to the longitudinal direction of the conveyor.

6. The automatic machine claimed in claim 3, wherein said conveying means are employed in pairs and the rotary calibrating rollers of said calibrating devices are such inclined that they have when viewed in plan a herring-bone configuration the divergence of which is oriented in the direction of operation of the conveyors.

* * * * *